United States Patent [19]
Ambrozic

[11] Patent Number: 5,996,527
[45] Date of Patent: Dec. 7, 1999

[54] KAYAK ROD HOLDER

[76] Inventor: Mark Ambrozic, 85 Glencrest Blvd., East York, Ontario, Canada, M4B 1L7

[21] Appl. No.: 09/022,460

[22] Filed: Feb. 12, 1998

[51] Int. Cl.[6] .................................................. B63B 35/00
[52] U.S. Cl. ........................................... 114/347; 114/364
[58] Field of Search .................................. 114/343, 347, 114/363, 364

[56] References Cited

U.S. PATENT DOCUMENTS

| | | | |
|---|---|---|---|
| 2,655,669 | 10/1953 | Schaper | 9/24 |
| 2,852,218 | 9/1958 | Stires | 248/39 |
| 2,890,847 | 6/1959 | Minton et al. | 248/40 |
| 3,140,069 | 7/1964 | McBurney et al. | 248/40 |
| 3,325,127 | 6/1967 | Doskocil | 248/38 |
| 4,453,490 | 6/1984 | Miller | 114/364 |
| 4,640,039 | 2/1987 | O'Neill | 43/21.2 |
| 4,739,720 | 4/1988 | Jarschke | 114/347 |
| 5,243,928 | 9/1993 | Brenaman | 114/347 |
| 5,325,806 | 7/1994 | Lee | 114/347 |
| 5,501,169 | 3/1996 | Denker | 114/364 |

OTHER PUBLICATIONS

Printout from the Internet—Mar. 5, 1998 (oceankayak.com).
Printout from the Internet—Mar. 5, 1998 (deluge.com).
Printout from the Internet—Mar. 5, 1998 (waldenpad).
Excerpt from the Bass Proshops Catatlogue.
Printout from the Internet—Mar. 8, 1998 (leetackle.ca).
Printout from the Internet—Mar. 8,1998 (sportsmansweb.com).
Printout from the Internet—Mar. 8,1998 (down–east.com).
Printout from the Internet—Mar. 8,1998 (cabelas.com).
Printout form the Internet—Mar. 8,1998 (gate.net).
Printout from the Internet—Mar. 8,1998 (fishnet.com).

*Primary Examiner*—Stephen Avila
*Attorney, Agent, or Firm*—McAulay Nissen Goldberg Kiel & Hand, LLP

[57] ABSTRACT

There is provided an improved apparatus for transporting a fishing rod on a kayak deck. The apparatus comprises a first part adapted to be releasably mounted to the bow of the kayak deck, a second part adapted to be releasably mounted at a position on the bow of the deck adjacent the well of the kayak and a support on the first and second parts for holding a rod in place along a longitudinal axis of the kayak in an inoperable position when the parts are in mounted position on the kayak.

16 Claims, 3 Drawing Sheets

KAYAK ROD HOLDER

FIELD OF THE INVENTION

This invention relates to an apparatus for transporting a fishing rod on a kayak deck.

BACKGROUND OF THE INVENTION

The kayak has long been used as a preferred method of marine transportation for one or two people. It is faster and more maneuverable than either a canoe or a rowboat and is not as restricted in use as a sailboat or a motorboat. However, the kayak has never been widely used as a fishing vessel, despite the fact that it is much quieter than a powerboat needed for trolling.

On its own, the kayak has no readily available storage space for fishing rods or other fishing accessories. Therefore, transporting the necessary equipment for fishing, particularly the poles, is extremely difficult. It is also difficult to troll in a kayak because there is no place to securely rest the rod and, in the event that a fish strikes, there is no place to rest the paddle to tend to the rod. Therefore, the inherent advantages of a kayak have not to date been utilized as a fishing vessel.

There have been attempts in the prior art to increase the storage capability of a kayak. For example reference may be had to U.S. Pat. No. 4,739,720 of Jarschke, issued Apr. 26, 1988 and U.S. Pat. No. 5,243,928 of Brenaman, issued Sep. 14, 1993. Neither of the devices disclosed in those references, however, serves to improve the use of the kayak as a fishing vessel.

Devices designed to specifically hold fishing rods are often designed for canoes or motorized boats and therefore, do not meet the design criteria of a kayak and cannot be adapted for use on a kayak. In this respect, reference may be had to the following U.S. patent references:

U.S. Pat. No. 2,655,669 of Schaper, issued Oct. 20, 1953;
U.S. Pat. No. 2,852,218 of Stires, issued Sep. 16, 1958;
U.S. Pat. No. 2,890,847 of Minton et al., issued Jun. 16, 1959;
U.S. Pat. No. 3,140,069 of McBurney et al., issued Jul. 7, 1964;
U.S. Pat. No. 3,325,127 of Doskocil, issued Jun. 13, 1967;
U.S. Pat. No. 4,453,490 of Miller, issued Jun. 12, 1984;
U.S. Pat. No. 4,640,039 of O'Neill, issued Feb. 3, 1987; and
U.S. Pat. No. 5,501,169 of Denker, issued Mar. 26, 1996.

SUMMARY OF THE INVENTION

It is therefore an object of the present invention to provide an apparatus for transporting a fishing rod on a kayak deck.

In one aspect of the invention, there is provided an apparatus for transporting a fishing rod on a kayak deck. The apparatus comprises a first part adapted to be releasably mounted to the bow of the kayak deck, a second part adapted to be releasably mounted at a position on the bow of the deck adjacent the well of the kayak and support means on the first and second parts for holding a rod in place along a longitudinal axis of the kayak in an inoperable position when the parts are in mounted position on the kayak.

In another aspect of the invention, there is further provided a track means on the second part for holding a rod in place along a lateral axis of the kayak in an operable position.

In another aspect of the invention, there is further provided a receiving means on the second part for holding a paddle in an inoperable position along a lateral axis of the kayak.

In another aspect of the invention, the support means comprises at least one open channel in the first part and at least one closeable channel in the second part. The open channel and the closeable channel are longitudinally aligned.

BRIEF DESCRIPTION OF THE DRAWINGS

These and other advantages of the invention will become apparent upon reading the following detailed description and upon referring to the drawings in which.

Figure 1:
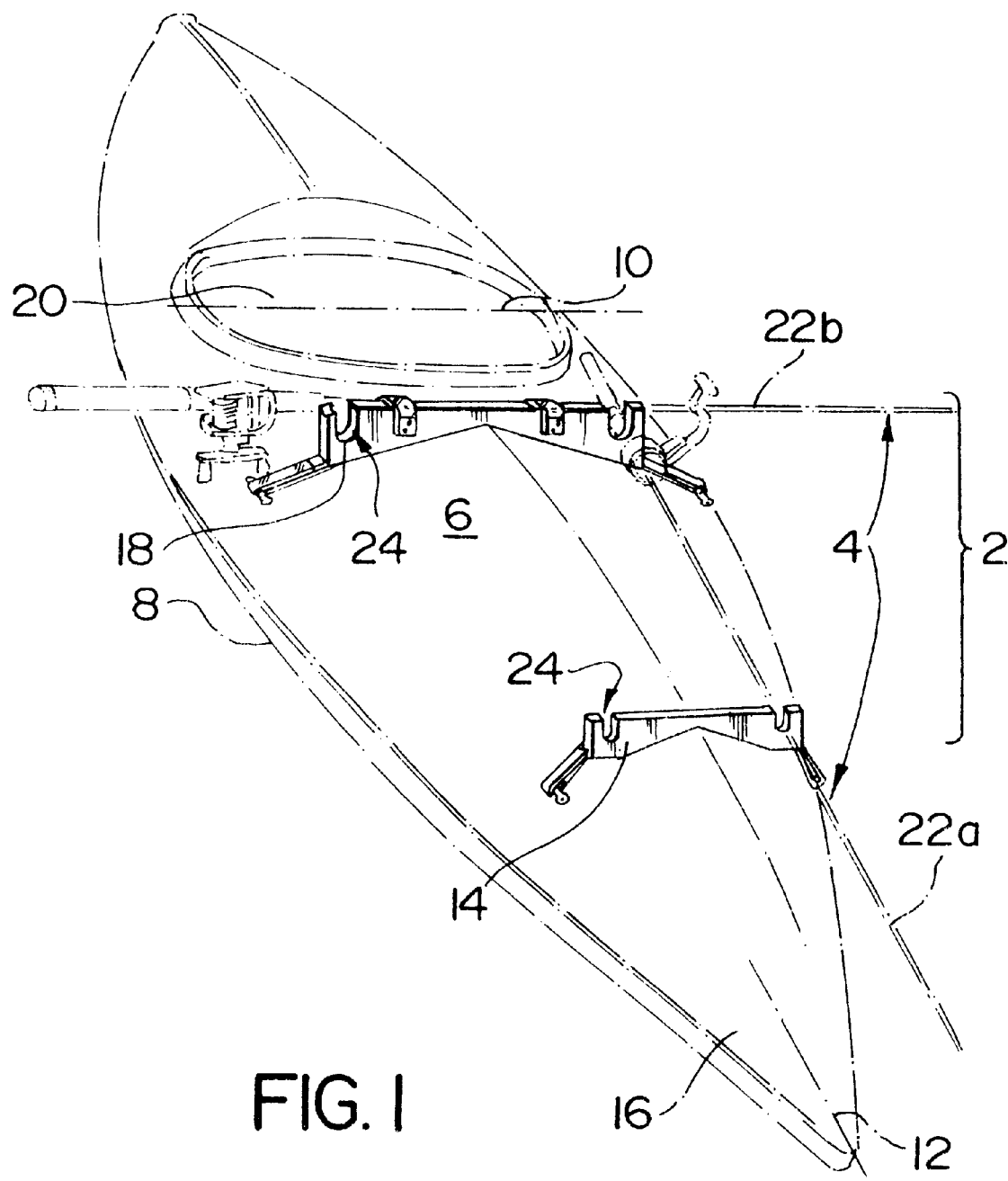
FIG. 1 is a perspective view of the apparatus in accordance with the present invention in situ on a kayak.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

Turning to the drawings, FIG. 1 illustrates an apparatus 2 for transporting a fishing rod 4 or the like on the deck 6 of a kayak 8 which has a lateral axis 10 and a longitudinal axis 12. The apparatus 2 may be designed to fit any standard sized kayak 8 or can be customized for any particular kayak 8 as required.

Figure 2:
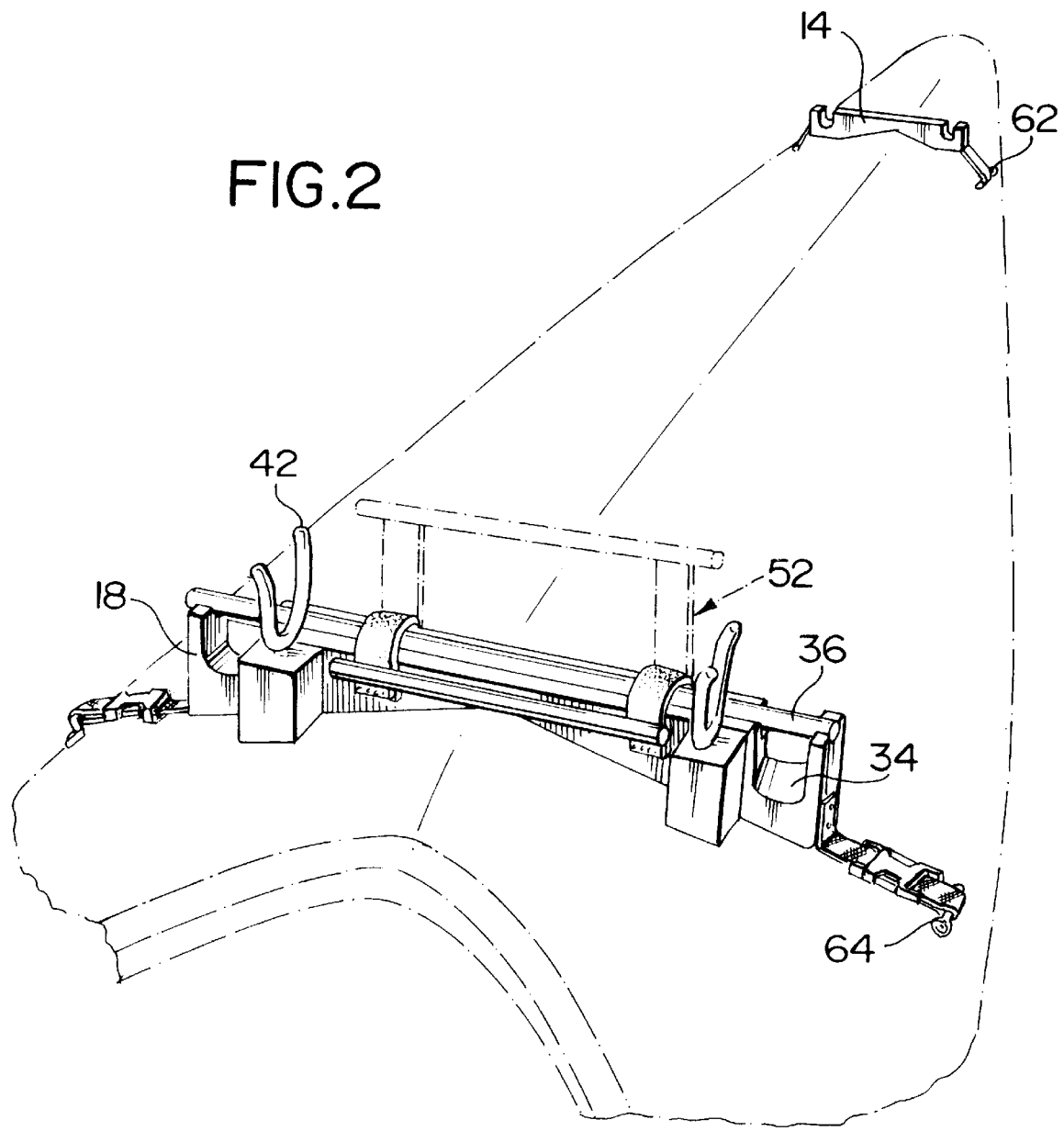
FIG. 2 is another perspective view of the apparatus in accordance with the present invention in situ on a kayak.

The apparatus 2 comprises a first part 14 which is adapted to be releasably mounted to the bow 16 of the deck 6, towards the forward end of the kayak 8 and a second part 18 which is also adapted to be releasably mounted to the deck 6 of the kayak 8, although it is preferably mounted at a position on the bow 16 adjacent the well 20, as shown in FIGS. 1 and 2. The first part 14 and second part 18 are mounted on the deck 6 along a central axis of the kayak 8 and are adapted to support a fishing rod 22b in a position along the lateral axis 10 or a fishing rod 22a in a place within support means 24 along the longitudinal axis 12 or a combination of the two possibilities in a manner to be further described below.

Figure 3:
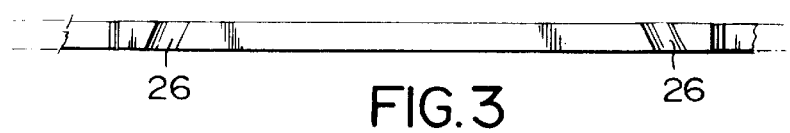
FIG. 3 is a top plan view of the first part of the present invention.
Figure 4:
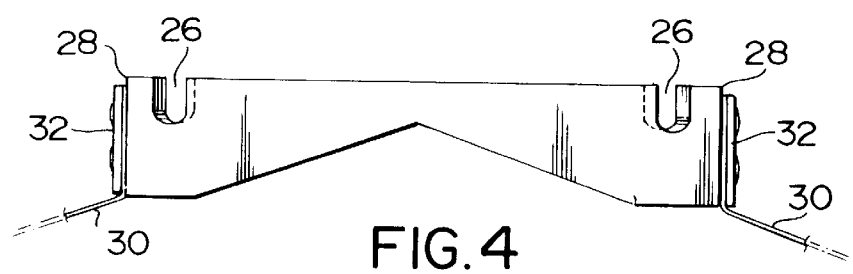
FIG. 4 is a front plan view of the first part of the present invention.

With reference to FIGS. 3 and 4, the first part 14 is shown in detail. The portion of the support means 24 in the first part 14 comprises at least one and preferably a pair of open channels 26 angled outwardly so as to align with the portion of the support means 24 in the second part 18. Mounted to the outer faces 28 of the first part 14 there are provided straps 30 constructed so as to releasably mount the first part 14 to the kayak 8. The straps may be made of velcro™ or are preferably constructed with a plastic adjustable buckle which provides greater holding force and more durability. The straps 30 can be fixed to the first part 14 in several different fashions, including by means of mounting brackets 32 as illustrated in FIG. 4.

Figure 5:
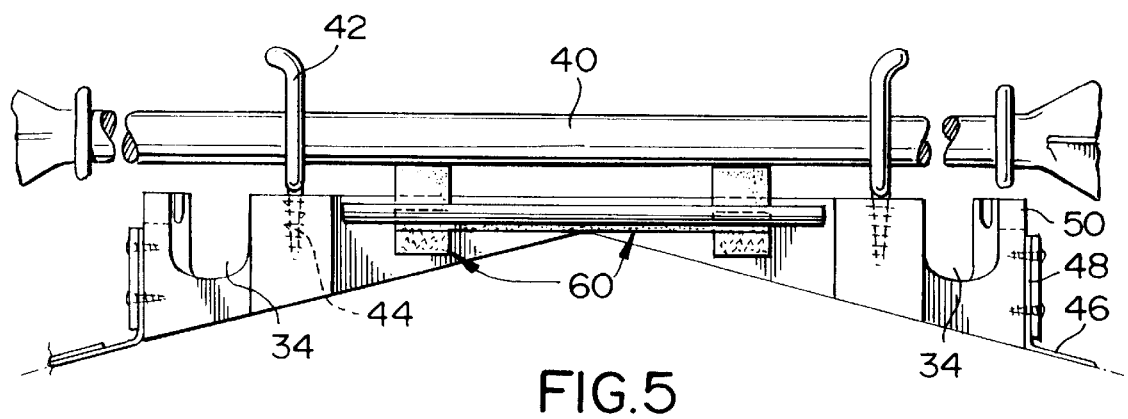
FIG. 5 is a front elevation view of the second part of the present invention.
Figure 6:
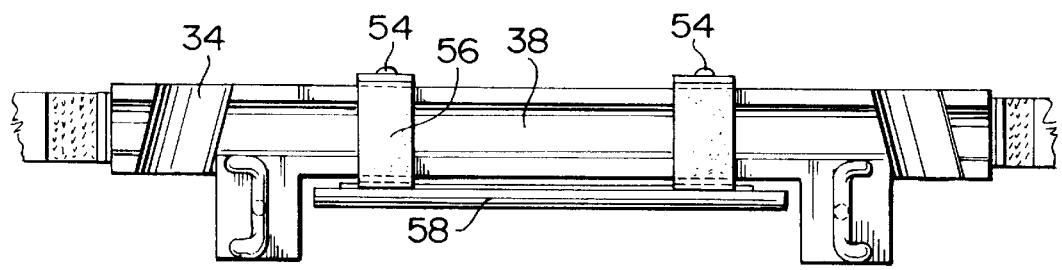
FIG. 6 is a top plan view of the second part of the present invention.

The second part 18 is illustrated in FIGS. 5 and 6 in detail. The portion of the support means 24 comprises at least one and preferably a pair of channels 34 which channels 34 are closeable by means of a rod 36 or other suitable means to cover the channels 34 with or without the rods 22a and 22b in place. For example, it is also possible to use a rubberized rope strung along the bottom of the channel 34 to hold the rods 22a, 22b by placing them under the rope.

The second part 18 further comprises a channel or track 38 which is adapted to hold the rod 22b in place in an operable position for trolling from the kayak 8. There may also be provided a receiving means for holding the paddle 40 in an inoperable position along the lateral axis 10 while it is not needed but which maintains the paddle 40 readily available to the user (not shown) of the kayak 8, in the form of a pair of hooks 42. The hooks 42 can be fixed to the second part 18 by means of screws 44 or other similar fasteners or the hooks 42 may be self tapping. Both the first 14 and the second 18 parts are preferably made of rubber which is suitable for the construction of the apparatus 2 to fit any standard kayak 8 or fiberglass, which is better suited to a customization of the apparatus 2 to the kayak 8, although other materials may be found suitable by those skilled in the art.

The second part 18 is adapted to be releasably mounted to the kayak 8 by means of straps 46 fixed by metal brackets 48 attached to opposing outer faces 50 of the second part 18. The straps 46 may be velcro™ or adjustable plastic buckled straps, as with straps 30. There is also attached a cover 52 to the second part 18 by means of metal plates 54. The cover 52 in moveable between the open position shown in phantom in FIG. 2 and the closed position to hold the trolling rod 22b or the rod 36 used to hold the rods 22a in place. The cover 52 comprises a first part 56 of velcro™ straps attached to the metal plates 54, a wooden bar 58 and the mating part 60 of the velcro™ straps fixed to the second part 18 by means of adhesive or mechanical fasteners. The cover may be employed to hold the rod 22a in position during trolling and can be raised or lowered as required.

In use therefore, the apparatus 2 may fulfill several functions separately or simultaneously. As shown in FIG. 1 the first part 14 is releasably mounted to the deck 6 of the kayak 8 by passing the straps 30 through chartline brackets 62 (which are often supplied standard with the kayak 8 or which can readily be fixed to the kayak 8) and the second part 18 is similarly releasably mounted to the deck 6 by passing the straps 46 through the chartline brackets 64 adjacent the well 20.

With the apparatus in place on the kayak 8, the rod 22a is held in place along the longitudinal axis 12 of the kayak 8 in an inoperable position suitable for transporting. Although only one rod 22a is shown, it will be readily understood from the drawings that a second rod (not shown) could also be held within the support means 24 in the inoperable transporting position where the first part 14 and the second part 18 comprise each a pair of channels 26 and 34 respectively.

The trolling rod 22b is held laterally in place within the track 38 and held down by the cover 52 for either transport or trolling as desired. Thus, while the user is paddling the kayak 8, the rod 22b may be used for trolling and the rod 22a may be held in an inoperable position along the longitudinal axis 12. However, the paddle 40 can be stored in the hooks 42 while the user fishes with the rod 22a or the rod 22b.

Thus, it is apparent that there has been provided in accordance with the invention a kayak rod holder that fully satisfies the objects, aims and advantages set forth above. While the invention has been described in conjunction with illustrated embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

The embodiments of the invention in which an exclusive property or privilege is claimed are defined as follows: what I/we claim as my/our invention:

1. An apparatus for transporting a fishing rod on a kayak deck, the apparatus comprising:

a first part adapted to be releasably mounted to the bow of the kayak deck;

a second part adapted to be releasably mounted at a position on the bow of the deck adjacent a well of the kayak;

support means on said first and second parts for holding a rod in place along a longitudinal axis of the kayak in an inoperable position when said parts are in mounted position on said kayak, said support means comprising at least one open channel in said first part and at least one closeable channel in said second part, said open channel and said closeable channel being longitudinally aligned.

2. The apparatus of claim 1 further comprising a first pair of brackets mounted to said kayak deck and a pair of cooperating straps affixed to said first part and releasably securable to said first pair of brackets to secure said first part to said kayak deck.

3. The apparatus of claim 2 further comprising a second pair of brackets mounted to said kayak deck adjacent the well of the kayak and a pair of cooperating straps affixed to said second part and releasably securable to said second pair of brackets to releasably secure said second part to said kayak deck.

4. An apparatus for transporting a fishing rod on a kayak deck, the apparatus comprising:

a first part adapted to be releasably mounted to the bow of the kayak deck;

a second part adapted to be releasably mounted at a position on the bow of the deck adjacent a well of the kayak; and support means on said first and second parts for holding a rod in place along a longitudinal axis of the kayak in an inoperable position;

track means on said second part for holding a rod in place along a lateral axis of the kayak in an operable position; and receiving means on said second part for holding a paddle in an inoperable position along a lateral axis of the kayak.

5. The apparatus of claim 4 further comprising cover means to releasably secure said rod in said track means.

6. The apparatus of claim 5 wherein said support means comprises at least one open channel in said first part and at least one closeable channel in said second part, said open channel and said closeable channel being longitudinally aligned.

7. An apparatus for transporting a fishing rod on a kayak deck comprising a first part adapted to be releasably mounted to the bow of the kayak deck;

a second part adapted to be releasably mounted at a position on the bow of the deck adjacent a well of the kayak;

support means on said first and second parts for holding a rod in place along a longitudinal axis of the kayak in an inoperable position when said parts are in mounted position on said kayak; and track means on said second part for holding a rod in place along a lateral axis of the kayak in an operable position.

8. The apparatus of claim 7 further comprising cover means to releasably secure said rod in said track means.

9. The apparatus of claim 8 further comprising at least one loop and eye fastener strap to hold said cover means in position to secure said rod.

10. The apparatus of claim 7 further comprising receiving means on said second part for holding a paddle in an operable position along a lateral axis of the kayak.

11. The apparatus of claim 10 wherein said receiving means comprises at least one hook opening upwardly.

12. The apparatus of claim 7 wherein said support means comprises at least one open channel in said first part and at least one closeable channel in said second part, side open channel and said closeable channel being longitudinally aligned.

13. The apparatus of claim 7 further comprising a first pair of brackets mounted to said kayak deck and a pair of cooperating straps affixed to first part and releasably securable to said first pair of brackets to secure said first part to said kayak deck.

14. The apparatus of claim 13 further comprising a second pair of brackets mounted to said kayak deck adjacent the well of the kayak and a pair of cooperating straps affixed to said second part and releasably securable to said second pair to brackets to releasably secure said second part to said kayak deck.

15. The apparatus of claim 7 wherein said support means comprises an open channel in opposing lateral sides of said first part and a channel in opposing lateral sides of said second part.

16. In combination, a kayak having a deck and a well in said deck; and an apparatus for transporting a fishing rod on said deck, said apparatus including a first part releasably mounted on a bow of said deck, a second part releaseably mounted on said bow of said deck adjacent said well, support means on said first and second parts for holding a rod in place along a longitudinal axis of said kayak in an inoperable position of the rod and track means on said second part for holding a rod in place along a lateral axis of said kayak in an operable position of the rod.

* * * * *